(12) United States Patent
Chen

(10) Patent No.: US 6,320,493 B1
(45) Date of Patent: Nov. 20, 2001

(54) REMOTE CONTROL SECURITY SYSTEM FOR AUTOMOBILE ISSUING A FIXED BASIC CODE AND TWO VARIABLE CODES

(75) Inventor: Michael Chen, Taipei Hsien (TW)

(73) Assignee: Advance Security Inc., Taipei Hsien (TW)

(*) Notice: Subject to any disclaimer, the term of this patent is extended or adjusted under 35 U.S.C. 154(b) by 0 days.

(21) Appl. No.: 08/463,282

(22) Filed: Jun. 5, 1995

(51) Int. Cl.[7] ................................................ H04Q 3/02
(52) U.S. Cl. .................. 340/5.26; 340/5.21; 340/825.69
(58) Field of Search ........................... 340/825.31, 825.3, 340/825.69, 825.72

(56) References Cited

U.S. PATENT DOCUMENTS

| | | | |
|---|---|---|---|
| 4,723,121 | 2/1988 | van den Boom et al. ..... | 340/825.31 |
| 4,992,783 | * 2/1991 | Zdunek et al. .................. | 340/825.34 |
| 5,055,701 | * 10/1991 | Takeuchi ........................... | 307/10.2 |
| 5,103,221 | * 4/1992 | Memmola ...................... | 340/825.31 |
| 5,517,187 | 5/1996 | Bruwer et al. ................... | 340/825.3 |
| 5,554,977 | * 9/1996 | Joblonski et al. .............. | 340/825.31 |

* cited by examiner

Primary Examiner—Michael Horabik
(74) Attorney, Agent, or Firm—Bacon & Thomas

(57) ABSTRACT

A remote control security system includes a remote control unit, a receiving unit, and an operation unit connected to the receiving unit for performing or cancelling an alarm function. A combination code having a basic code and two sets of remedy codes is produced by an encoder. When the receiver has received the signals from the remote control unit, a decoder compares the basic code and the two sets of remedy codes received by the receiver with a reference basic code and two sets of remedy codes generated by the encoder and, if the received and reference codes match, the decoder sends a control signal to the operation unit. One of the remedy codes is varied by a counter once each time the remote control button is pushed and the other is varied by the counter during the time that the button is being pushed.

3 Claims, 3 Drawing Sheets

REMOTE CONTROL SECURITY SYSTEM FOR AUTOMOBILE ISSUING A FIXED BASIC CODE AND TWO VARIABLE CODES

BACKGROUND OF THE INVENTION

The present invention relates to an improved remote control security system having a remote control unit, a receiving unit, and an operation unit connected to the receiving unit for activating or deactivating the alarm function of the security system. A combination code having a basic code and two sets of remedy codes is issued by an encoder. When the receiver receives the combination code signal from the remote control unit, a decoder compares the basic code and remedy codes produced by itself with the basic code and two sets of the remedy code of the code signal and, if the codes comparison matches, the decoder sends a control signal to the operation unit.

Luxury cars are easily spotted and often are stolen by burglars in big cities, so security systems or burglar proof devices of various kinds for automobiles have been designed and mounted onto those vehicles.

The basic burglar proof devices have an emitter which issues a fixed code, and a receiver mounted in an automobile for receiving the emitted code and making comparison therewith. If the two codes match, an alarm system is then automatically set or removed. However, a burglar holding a signal receiver and positioned in the vicinity of an automobile can decode the fixed code so that the burglar can remove the alarm system and steal the car with ease later.

Another prior art which has been developed to overcome the above cited problem is an alarm system which is not equipped with a fixed code but a variable one. However, the variable code is comprised of two sets of code, i.e., a fixed basic code and a variable code in combination. The variable code is produced constantly by a code generator. Although, the code is varible every time, the burglar can still detect the code by receiving codes produced while the user is holding down the button. It is more difficult to capture the code in this manner but it is still possible.

To overcome the above cited problems, the present inventor has provided a further improved alarm system for an automobile so that the issued signal will not be detected with ease.

SUMMARY OF THE INVENTION

Therefore, the primary object of the present invention is to provide an improved remote control system which can produce a code combination made up of three codes, one fixed basic code and two different remedy codes so as to increase the variety of code combinations, permitting codes to be variable in 256 combinations.

Another object of the present invention is to provide an improved security system wherein one of the remedy codes can be changed to another code every time a button is pressed and one of the remedy code is continuously varied as long as the button is being pressed until it is released, whereby the code will not be detected in use.

DETAILED DESCRIPTION OF THE PREFERRED EMBODIMENT

Figure 1:
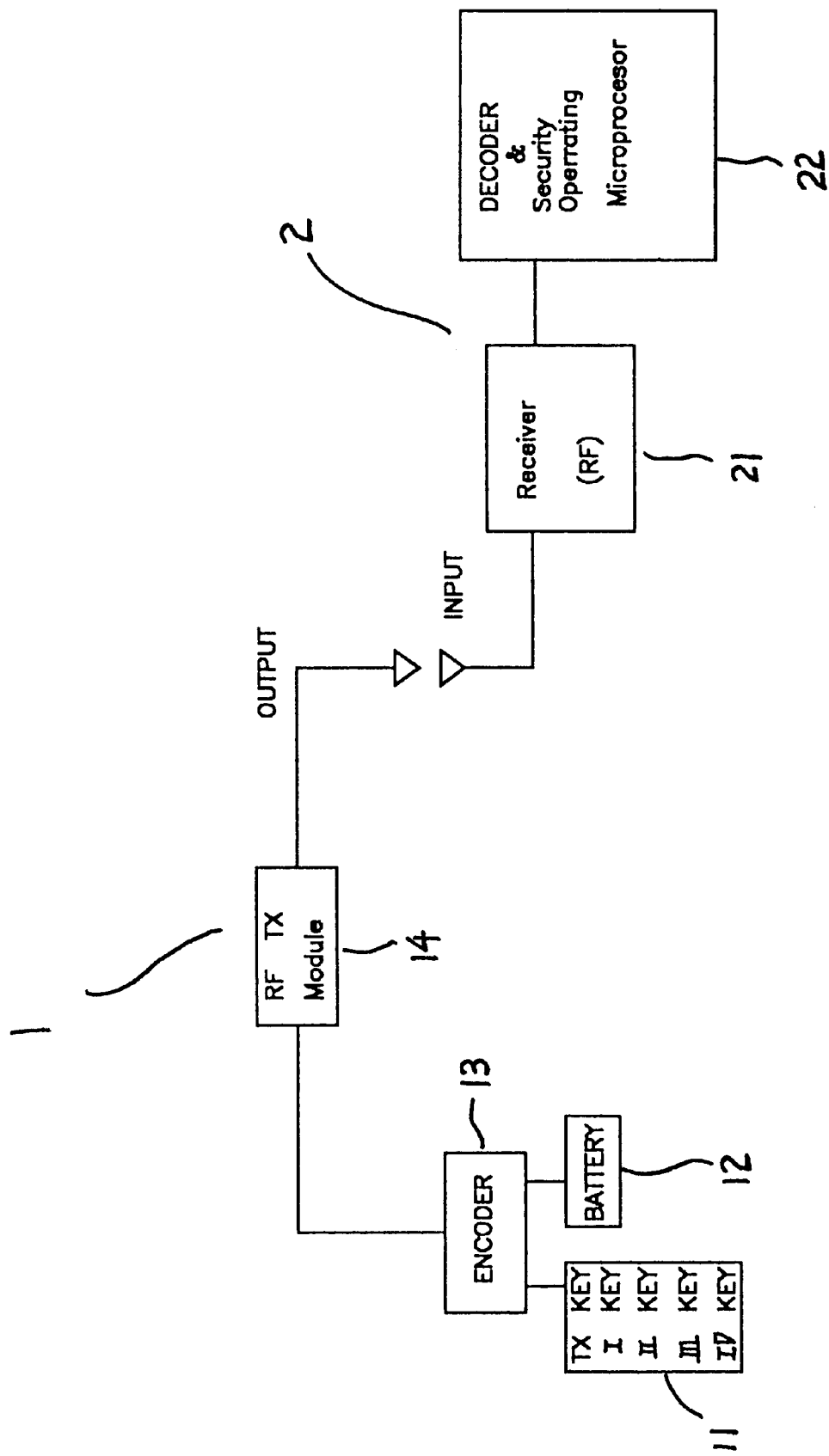
FIG. 1 is a block diagram showing the whole structure of the present invention.

Referring to FIG. 1, the present invention is comprised of a remote control unit 1 and a receiving unit 2, the remote control unit 1 is made up of a key board 11 (KEY I-IV), a battery 12, an encoder 13 and a signal emitter 14. The receiving unit 2 includes a receiver 21 which receives code signals from the emitter 14, and a decoder and a security operating microprocessor 22 which is actuated in accordance with the input signals.

Figure 2:
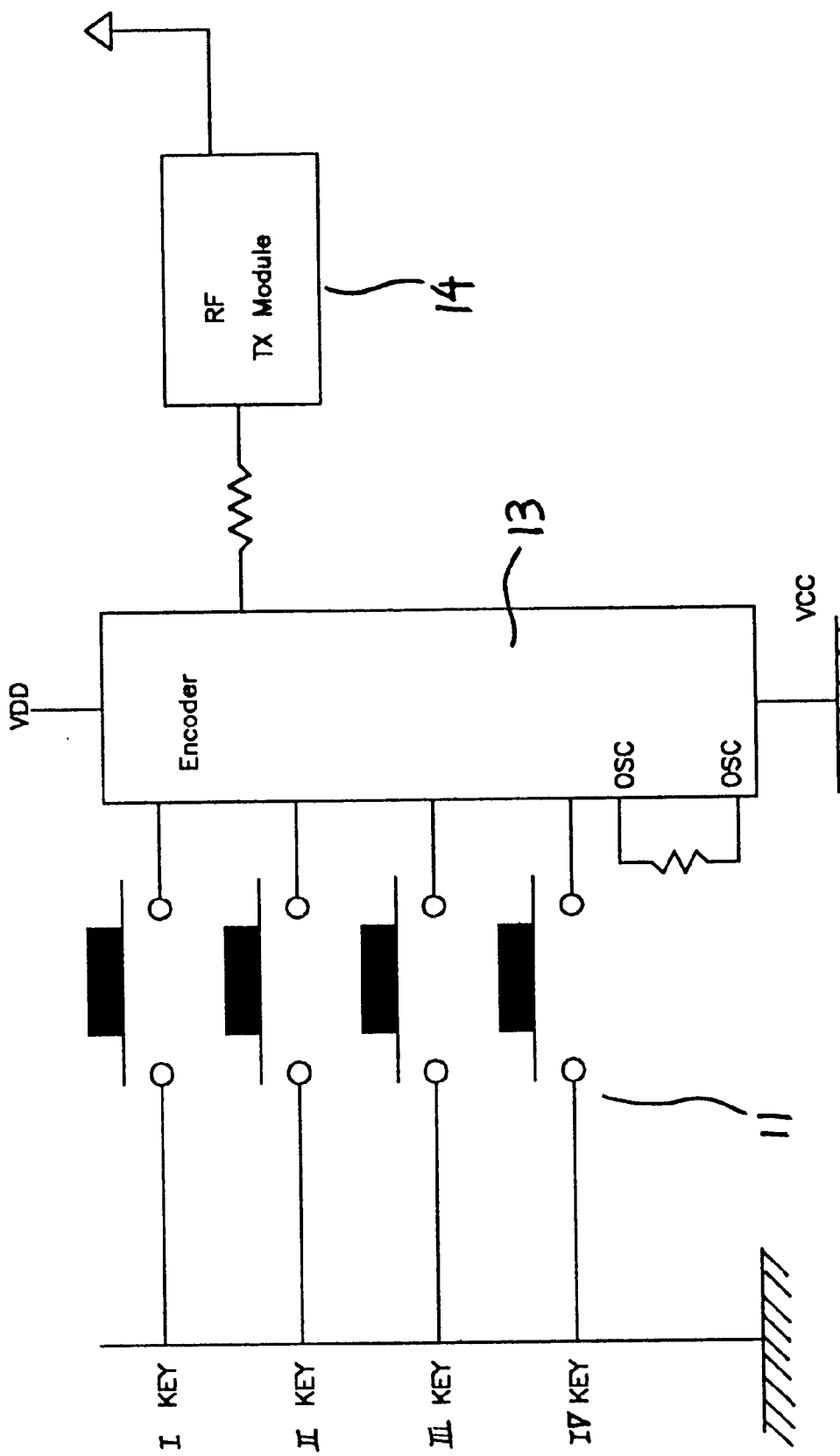
FIG. 2 is a structural diagram of the remote control unit of the present invention.

Referring to FIG. 2, the remote control unit 1 of the present invention is illustrated wherein the encoder 13 has a computer program and a counter (not shown 3). The computer program generates one fixed basic code and the counter produces two sets of remedy code so as to form a correct combination code. The remedy codes can be sequentially varied by way of continual signals from the keyboard 11, as follows, The basic code produced by the encoder 13 is remains unchanged all the time, but one set of the remedy codes is constantly varied in sequence by means of the counter for so long as signal from the keyboard is being received, while the other set of the remedy codes is varied once by the counter in a sequential manner each time a signal from the keyboard is received. The combination code is made up of the above fixed basic code and the remedy codes, and combination code is delivered by the code emitter to the receiving unit 2.

Figure 3:
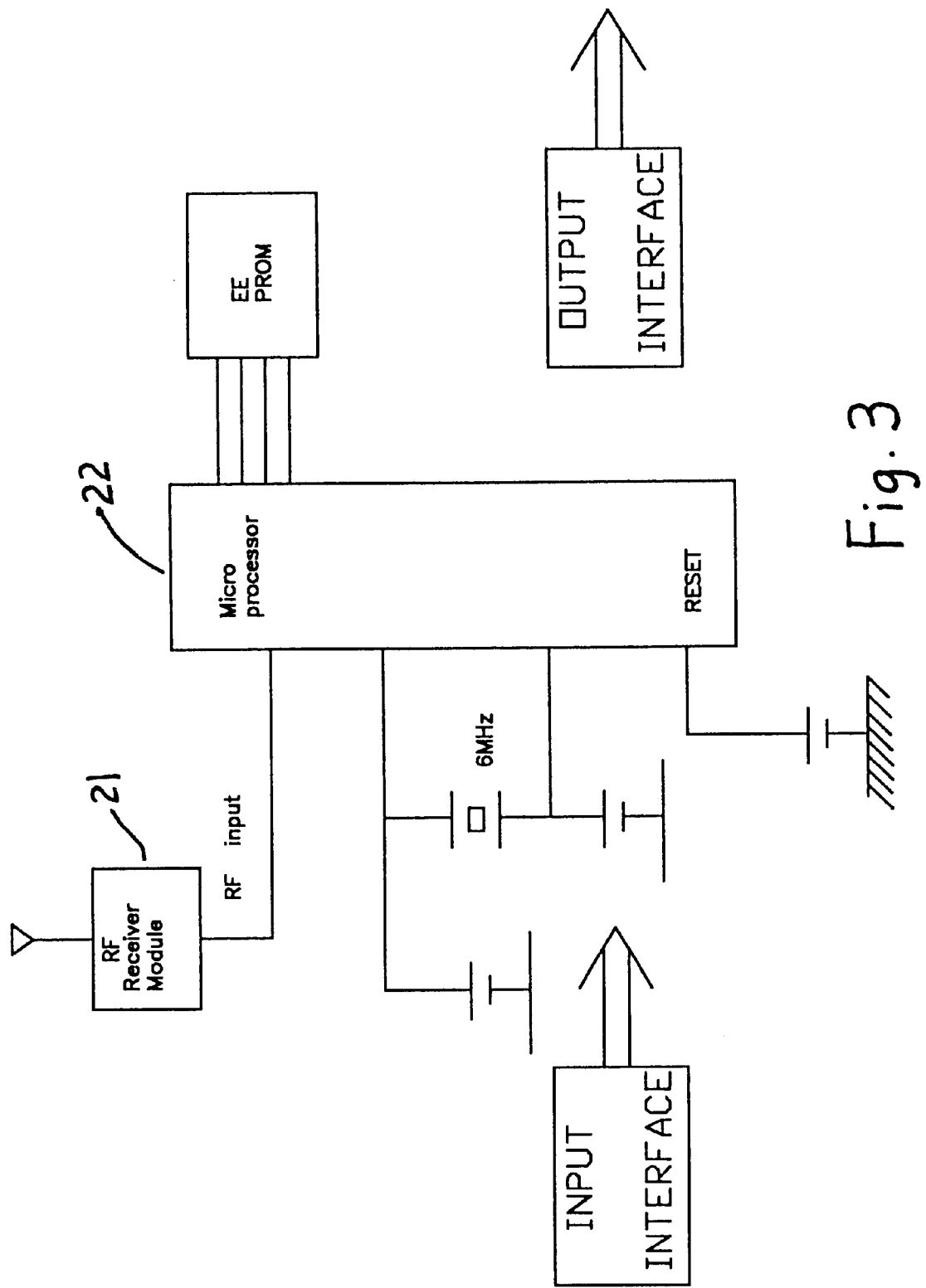
FIG. 3 is a structural diagram of the receiving unit of the present invention.

Referring to FIG. 3, the receiving unit 2 is illustrated wherein the receiver 21 receives signals transmitted from the remote control unit 1 and delivers the same to the decoder 22 for comparison. The decoder 22 is structured in the same manner as that of the encoder 13 and is operated by a program to produce the same basic code and two sequentially arranged sets of remedy code. When the decoder is actuated by an input signal, it generates the combination code as described above, then the received basic code and two sets of remedy code are compared with the basic code and two sets of remedy code produced by the decoder 22 itself. If the two basic codes conform to each other, and the intermediate sets of remedy code and the last sets of remedy code are in conformance too, the decoder 22 will send a control signal to an operation unit.

I claim:

1. In a remote control security system for an automobile, comprising a remote control unit, connected to said receiving unit; said remote control unit emitting a combination code signal and said receiving unit receiving said combination code signal so as to control operation of said security system:

wherein said remote control unit includes a keyboard, an encoder and a signal emitter; said encoder produces a combination code corresponding to said combination code signal according to a signal from said keyboard, and said combination code is transmitted by said signal emitter;

wherein said receiving unit includes a receiver and a decoder; said receiver receiving the combination code signal sent by said emitting means of said remote control unit and said decoder including means for comparing said a received combination code decoded from said combination code signal with a combination code produced by said decoder; and wherein if the received combination code matches the combination code produced by the decoder, a control signal is transmitted to said operation unit to control operation of the security system, the improvement wherein the combination code comprises a fixed combination code and two variable remedy codes, and said encoder and decoder each includes means for sequentially varying a first of the remedy codes once each time a key on said keyboard is pressed, and for sequentially varying a second of the remedy codes constantly between a time that said key is pressed and a time that said key is released.

2. A remote control security system for an automobile as claimed in claim 1 wherein said means for sequentially varying the first and second remedy codes comprises a counter in said encoder.

3. A remote control security system for an automobile as claimed in claim 1 wherein said decoder of said receiving unit includes a counter for producing said combination code which is compared by the decoder with the received code.

\* \* \* \* \*